United States Patent

[11] 3,619,791

[72] Inventor Harold Moreines
Springfield, N.J.
[21] Appl. No. 860,315
[22] Filed Sept. 23, 1969
[45] Patented Nov. 9, 1971
[73] Assignee The Bendix Corporation

[54] INTERMEDIATE AMPLITUDE SIGNAL SELECTOR
9 Claims, 4 Drawing Figs.

[52] U.S. Cl. .......... 328/117, 307/235, 328/137
[51] Int. Cl. .......... H03k 5/20
[50] Field of Search .......... 328/116, 117, 137; 307/235

[56] References Cited

UNITED STATES PATENTS

| | | | |
|---|---|---|---|
| 2,612,550 | 9/1952 | Jacobi | 328/117 X |
| 3,204,118 | 8/1965 | Rotier | 328/150 X |
| 3,252,008 | 5/1966 | Vandaveer, Jr. | 307/235 |
| 3,492,588 | 1/1970 | Woodward, Jr. | 328/117 X |

*Primary Examiner*—Donald D. Forrer
*Assistant Examiner*—John Zazworsky
*Attorneys*—Ronald G. Gillespie and Plante, Hartz, Smith & Thompson

ABSTRACT: An intermediate amplitude signal selector for selecting the *r*th ranking signal from *m* applied signals, where *m* is greater than three and *r* is the ranking in amplitude, comprising a plurality of gating circuits each receiving a different group of signals less than *m* and providing a signal corresponding to one of the applied signals whose amplitude is related to the other signals of the group, the circuit receiving a group including the *r*th ranking signal providing a signal corresponding thereto, and a gating network connected to the gating circuits and receiving the signals therefrom and providing a signal corresponding to the *r*th ranking signal.

INVENTOR.
Harold Moreines
BY
Ronald G. Gillespie
ATTORNEY

INVENTOR.
Harold Moreines
BY
Ronald G. Gillespie
ATTORNEY

INVENTOR.
Harold Moreines
BY
Ronald G. Gillespie
ATTORNEY

INTERMEDIATE AMPLITUDE SIGNAL SELECTOR

BACKGROUND OF THE INVENTION

1. Field of the Invention

This invention relates to a signal selector and, more particularly, to an intermediate amplitude signal selector.

2. Description of the Prior Art

Heretofore, signal selectors of the type disclosed in U.S. Pat. No. 3,311,837 issued to Harold Moreines and in U.S. application Ser. No. 596,994 by Harold Moreines, the inventor of the present invention, select an intermediate amplitude signal from a group of three signals. The Moreines' patent and application are assigned to The Bendix Corporation, assignee of the present invention.

The present invention differs from the Moreines patent and application in that it is capable of selecting a particular signal from a group of four or more signals while the prior art can only select a median amplitude signal of three signals. The Moreines patent and application does not suggest that a particular signal can be selected from a group of four or more signals, much less the manner of combining inputs to achieve the selection of the particular signal.

SUMMARY OF THE INVENTION

An intermediate amplitude signal selector for selecting the $r^{th}$ ranking signal from $m$ applied signals where $m$ is greater than four and $r$ is the rank in amplitude, comprising a plurality of selective gating circuits, each receiving a different group of signals less than $m$, for selecting an extreme signal in one sense of each group and providing at their outputs signals corresponding thereto. A gating network is connected to the outputs of the selective gating circuits and receives the signals therefrom and passes only the extreme signal of opposite sense which corresponds to the $r^{th}$ ranking signal. One object of the present invention is to select one signal from a group of four or more signals as determined by the amplitudes of the signals.

Another object of the present invention is to use a minimum number of gating circuits for the selection of a particular signal from a group of signals.

Another object of the invention is to select an extreme signal of one sense (either the least positive or most positive amplitude signal) from groups of signals and then selecting an extreme signal of opposite sense (either the most positive or least positive amplitude signal) from the selected signals to eliminate all but the $r^{th}$ ranking signal.

The foregoing and other objects and advantages of the invention will appear more fully hereinafter from a consideration of the detailed description which follows, taken together with the accompanying drawings wherein two embodiments of the invention are illustrated by way of example. It is to be expressly understood, however, that the drawings are for illustration purposes only and are not to be construed as defining the limits of the invention.

DESCRIPTION OF THE INVENTION

Figure 1:
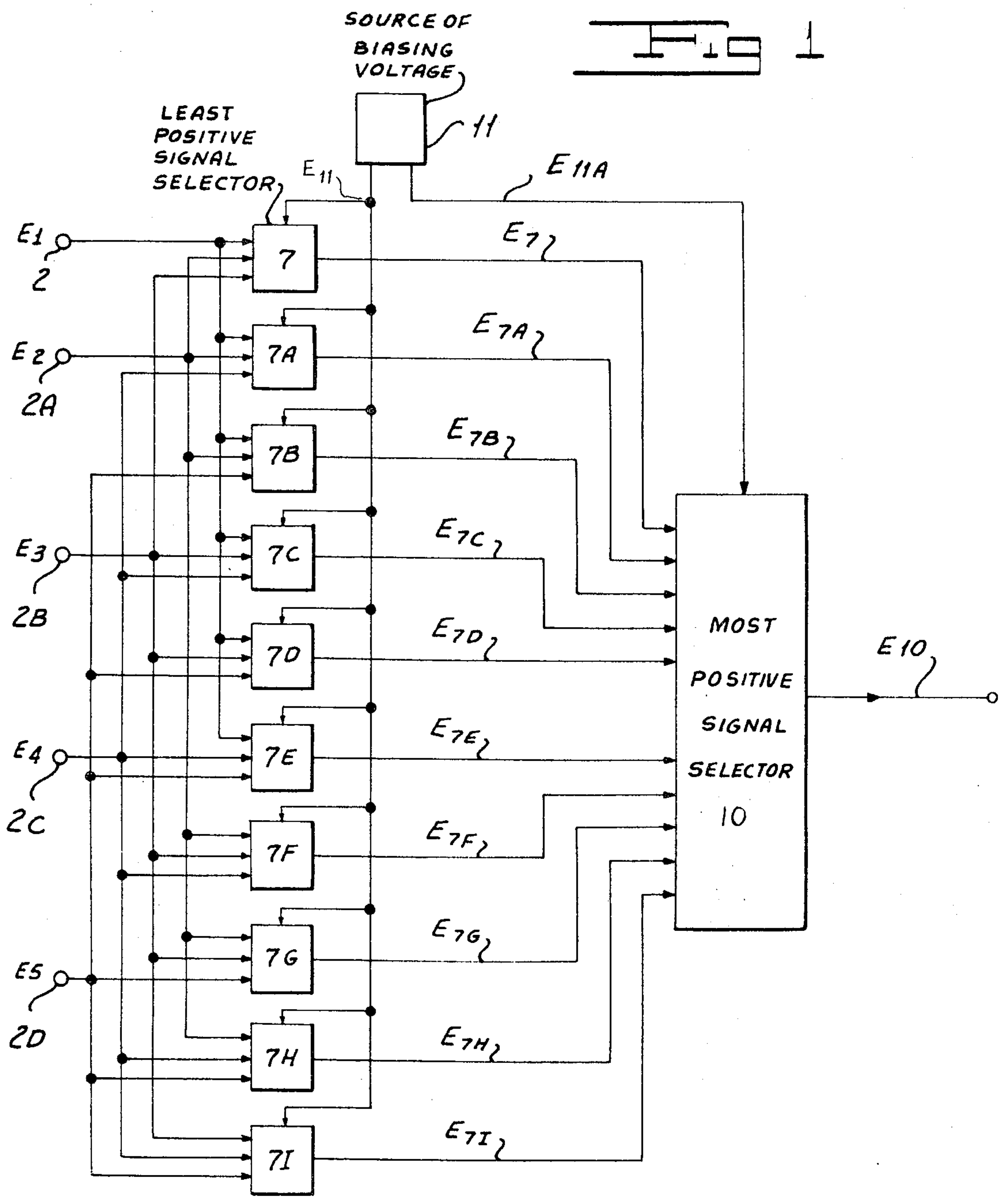
FIG. 1 shows a novel signal selector constructed in accordance with the present invention for selecting a third most positive direct current signal from a group of five direct current signals.
Figure 2:
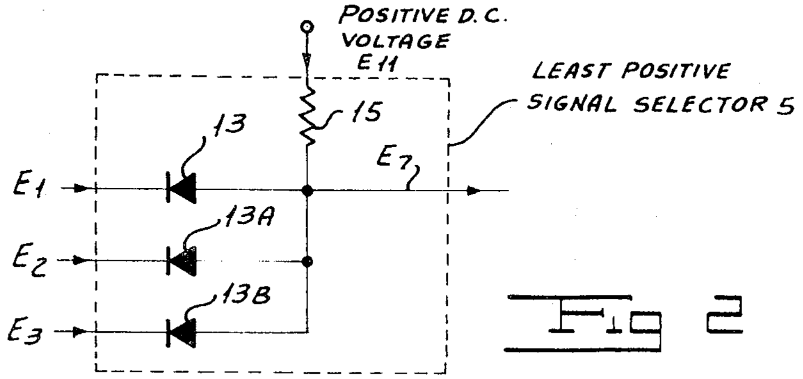
FIGS. 2 and 3 are schematic diagrams of the least positive signal selector and the most positive signal selector, respectively, shown in FIG. 1.

Referring to FIG. 1, there is shown an intermediate signal selector for selecting the third ranked signal with respect to the most positive signal, from a group of five signals and having terminals 2, 2A, 2B, 2C and 2D receiving signals $E_1$, $E_2$, $E_3$, $E_4$, and $E_5$ respectively. For purposes of explanation only, it is assumed that $E_1 \geq E_2 \geq E_3 \geq E_4 \geq E_5$. Least positive signal selectors 7 through 7I, which may be of the type shown in detail in FIG. 2, are connected to terminals 2 through 2D so that each least positive signal selector receives a different combination of three signals. A least positive signal selector provides a signal corresponding to the applied signal having the least positive amplitude as hereinafter explained.

Figure 3:
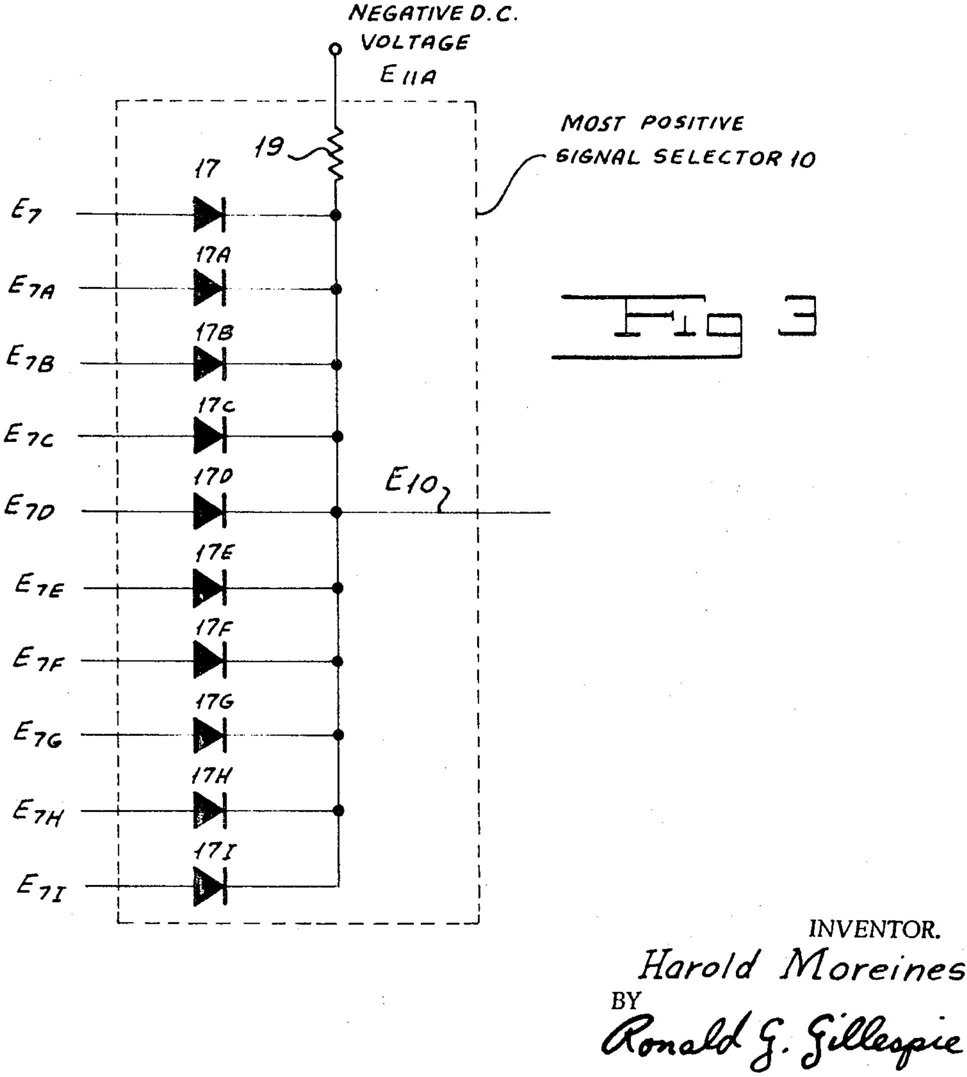

Selectors 7 through 7I provide signals $E_7$ through $E_{7I}$, respectively, which are applied to a most positive signal selector 10, which may be of the type shown in detail in FIG. 3. A most positive signal selector provides a signal corresponding to the most positive applied signal. Most positive selector 10 provides a signal $E_{10}$ corresponding to the third most positive signal in response to signals $E_7$ through $E_{7I}$.

When signals $E_1$ through $E_5$ are direct current signals, signals $E_7$ through $E_{7I}$ are direct current signals. Signal $E_7$ corresponds to signal $E_3$; signals $E_{7A}$,$E_{7C}$,$E_{7F}$, correspond to signal $E_4$; and signal $E_{7B}$, $E_{7D}$, $E_{7E}$, $E_{7G}$, $E_{7H}$ and $E_{7I}$ corresponds to signal $E_5$. Since signal $E_3$ is more positive than signals $E_4$ or $E_5$, signal $E_{10}$ corresponds to signal $E_3$.

When signals $E_1$ through $E_5$ are in phase alternating current signals, signals $E_7$ through $E_{7I}$ are in phase alternating current signals. During positive half-cycles, signal $E_7$ corresponds to signal $E_3$; signals $E_{7A}$, $E_{7C}$, $E_{7E}$ correspond to signal $E_4$; and signals $E_{7B}$, $E_{7D}$, $E_{7E}$, $E_{7G}$, $E_{7H}$ and $E_{7I}$ correspond to signal $E_5$. During negative half-cycles, signals $E_7$ through $E_{7E}$ correspond to signal $E_1$; signals $E_{7F}$ through $E_{7H}$ correspond to signal $E_2$ and signal $E_{7I}$ -corresponds to signal $E_3$. During the positive half-cycles of signal $E_7$ through $E_{7I}$ the most positive signal is $E_7$, while during the negative half-cycles the most positive signal is $E_{7I}$ so that signal $E_{10}$ from most positive signal selector corresponds to signal $E_3$.

A source 11 of fixed direct current voltages provides a positive direct current voltage $E_{11}$ to least amplitude signal selectors 7 through 7I and a negative direct current voltage $E_{11A}$ to most positive signal selector 10 to bias the signal selectors.

Referring to FIG. 2, there is shown least positive signal selector 5 having diodes 13, 13A and 13B clamping positive direct current voltage $E_{11}$ to the level of the least positive signal applied to the diodes. Signals $E_1$, $E_2$, and $E_3$ are applied to the cathodes of diodes 13, 13A and 13B respectively, while voltage $E_{11}$ is applied through a biasing resistor 15 to common connected anodes of the diodes.

Referring to FIG. 3, there is shown most positive signal selector 10 having diodes 17 through 17I having common connected cathodes and clamping negative direct current voltage $E_{11A}$ to the level of the most positive signal applied to the diodes to provide signal $E_{10}$. Signals 17 through 17I are applied to anodes of diodes 17 through 17I, respectively, while voltage $E_{11A}$ is applied through a biasing resistor 19 to the cathodes of the diodes.

Figure 4:
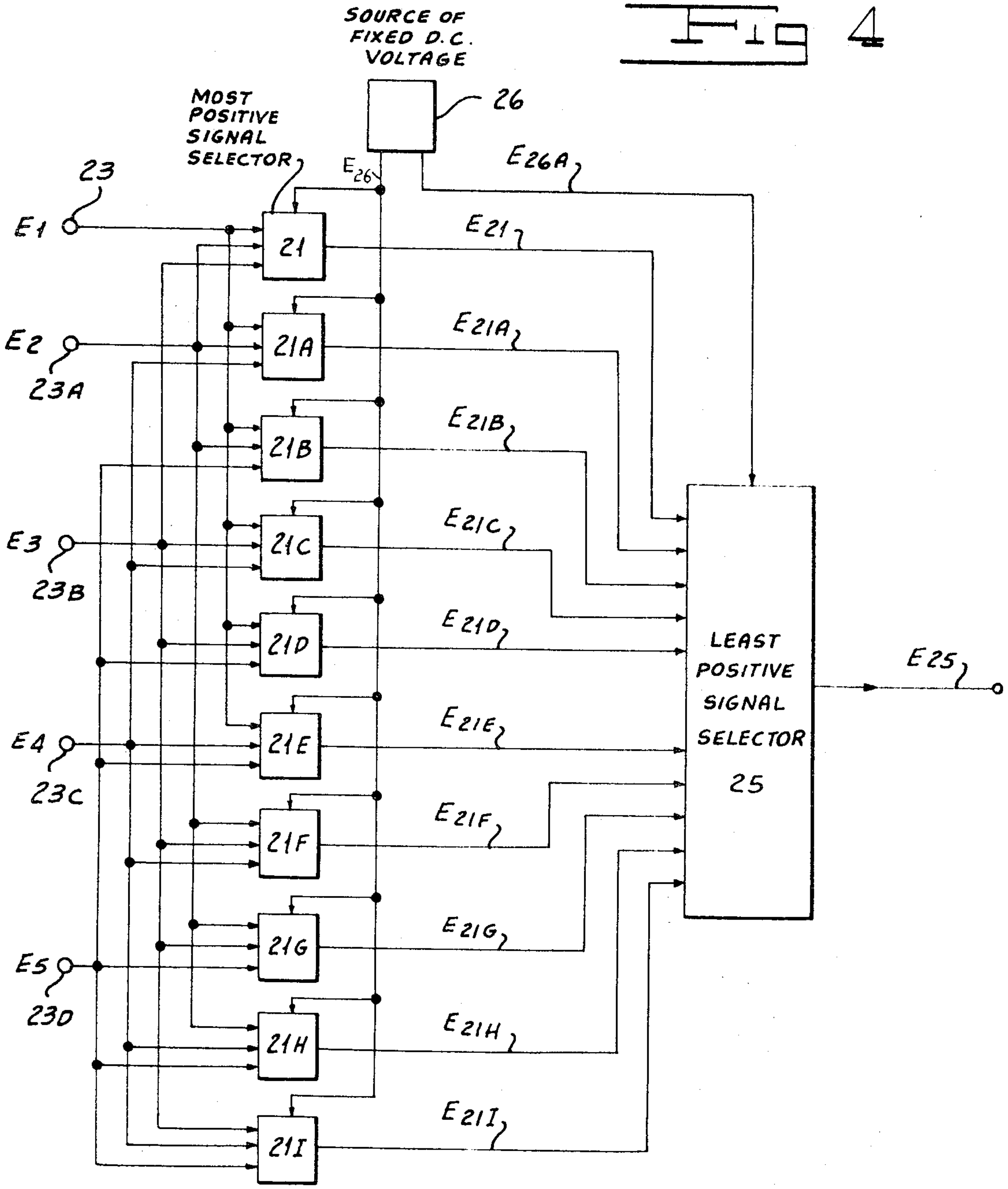
FIG. 4 is another novel signal selector constructed in accordance with the present invention for selecting the third most positive direct current signal from a group of five signals.

Another embodiment of the present invention for selecting the third ranked signal from a group of five signals is shown in FIG. 4, in which most positive signal selectors 21 through 21I are connected to terminals 23, 23A, 23B, 23C and 23D, receiving signals $E_1$, $E_2$, $E_3$, $E_4$and $E_5$, respectively, so that each most positive signal selector receives a different combination of three signals. Most positive signal selectors 21 through 21I are constructed and operate in a manner similar to most positive signal selector 10. Most positive signal selectors 21 through 21I apply signals $E_{21}$ through $E_{21I}$ respectively, to a least positive signal selector 25. Least positive signal selector 25 is constructed and operates in a manner similar to least positive signal selector 5 to provide a signal $E_{25}$ corresponding to the third most positive signal $E_3$.

When signals $E_1$ through $E_5$ are direct current signals, signals $E_{21}$ through $E_{21I}$ are direct current signals. Signals $E_{21}$ through $E_{21E}$ correspond to signal $E_1$, signals $E_{21F}$, $E_{21G}$, $E_{21H}$ corresponds to signal $E_2$. Since signal $E_3$ is less positive than signals $E_1$ and $E_2$, signal $E_{25}$ corresponds to signal $E_3$.

When signals $E_1$ through $E_5$ are in phase alternating current signals, signals $E_{21}$ through $E_{21I}$ are also in phase alternating current signals. During positive half-cycles, signals $E_{21}$ through $E_{21E}$ correspond to signal $E_1$, signals $E_{21F}$, $E_{21G}$, $E_{21H}$ correspond to signal $E_2$, and signal $E_{21I}$ corresponds to signal $E_3$. During negative half-cycles, signal $E_{21}$ corresponds to signal $E_3$, signals $E_{21A}$, $E_{21C}$, $EK_{21F}$ correspond to signal $E_4$ and signals $E_{21B}$, $E_{21D}$, $E_{21E}$, $E_{21G}$, $E_{21H}$ and $E_{21I}$ correspond to signal $E_5$. During the positive half-cycles signal $E_{21I}$ is the least positive while during the negative half cycle signal $E_{21}$ is the least positive so that signal $E_{25}$ corresponds to signal $E_3$.

A source 26 of fixed direct current voltages applies a negative direct current voltage $E_{26}$ to most positive signal selectors 21 through 21I and a positive direct current voltage $E_{26A}$ to least positive signal selector 25 to bias the signal selectors.

While the arrangement shown and described in FIGS. 1 and 4 select the third ranked signal from a group of five signals, the arrangement may be used for selecting any intermediate signal from any number of signals. An intermediate amplitude signal selector for selecting an $r^{th}$ ranking from $m$ applied signals may be constructed similar to the signal selector shown in FIG. 1 using N number of least positive signal selectors as determined by the following equation:

$N=(m!/r!\ (m-r)!)$ The signals are applied to the least positive signal selectors in different combinations of $r$ number of signals.

Another type of intermediate amplitude signal selector may also be constructed similar to that shown in FIG. 4 using N number of most positive signal selectors as determined by the following equation:

$N=(m!/(m-r+1)!\ (r-1)!)$ where $m$ is the number of applied signals and $r$ is the ranking of the selected signal with respect to the most positive signal. The signals are applied to the most positive signal selectors in different combination of $(m-r+)$ number of inputs.

When an alternating current signal, which is not the median ranked signal, is to be selected from a group of in phase alternating current signals and is applied to a signal selector of the type shown in FIG. 1, the positive direct current voltage $E_{11}$ from source 11 is replaced by a square wave voltage in phase with the alternating current signals. The square wave voltage effectively gates the least positive signal selectors so that each selector passes only the positive half-cycles of the least positive signal. Preferably the signal from the most positive signal selector is then applied to either a high-pass filter to provide an alternating current signal as the selected signal or to a low-pass filter to provide a direct current signal corresponding to the selected signal.

Similarly, a square wave voltage 180° out of phase with the alternating current signals replaces direct current voltage $E_{26}$ from source 26 and is applied to the most positive signal selectors of a signal selector of the type shown in FIG. 4 so that a nonmedian signal may be selected from a group of alternating current signals having the same phase. Each most positive signal selector passes positive half-cycles of the most positive applied signal. It is preferred that the signal from the least positive signal selector be applied to either a high pass filter to provide an alternating current signal as the selected signal or to a low pass filter to provide a direct current signal corresponding to the selected signal.

The present invention as heretofore described uses a minimum number of gating circuits to select one signal from a group of at least five signals as determined by the amplitudes of the signals. The present invention selects an extreme signal of one sense (either the most positive or least positive amplitude signal) from groups of signals and then select an extreme signal of opposite sense (either the least positive or most positive amplitude signal) from the selected signals to eliminate all but the $r^{th}$ ranking signal.

It will be obvious that either the least positive or most positive amplitude signal of each group is selected by the least positive signal selector 7 or the most positive signal selector 21 and the associated most positive signal selector 10 or least positive signal selector 25 is used to select the most positive or the least positive amplitude signal. This arrangement using the number of selectors in accordance with equation 1 and 2 will eliminate all signals except the $r^{th}$ ranking signal.

While several embodiments of the invention have been illustrated and described in detail, it is to be expressly understood that the invention is not limited thereto. Various changes may also be made in the design and arrangement of the parts without departing from the spirit and scope of the invention as the same will now be understood by those skilled in the art.

What is claimed is:

1. An intermediate amplitude signal selector for selecting the $r^{th}$ ranking signal from $m$ applied signals where $m$ is greater than three and $r$ gating the rank in amplitude, comprising a plurality of selective gating circuits, each receiving a different group of signals less than $m$, for selecting an extreme signal in one sense of each group and providing at their outputs signals corresponding thereto, and a gating network connected to the outputs of the selective gating circuits and receiving the signals therefrom and passing only the extreme signal of opposite sense which corresponds to the $r^{th}$ ranking signal.

2. An intermediate amplitude signal selector of the kind described in claim 1 in which each selective gating circuit has means for selecting the signal of the group having the least positive amplitude, and the gating network has means for selecting the most positive signal and providing a signal corresponding to the $r^{th}$ signal.

3. An intermediate amplitude signal selector of the kind described in claim 2 in which the number N of least positive signal selecting means corresponds to the number $m$ of applied signals and to the $r^{th}$ ranking signal to be selected in accordance with the expression $N = (m!/r!\ (m-r)!)$, and the number of inputs to each least positive signals selector equals $r$.

4. An intermediate amplitude signal selector of the kind described in claim 2 in which least positive signal selecting means includes a plurality of diodes to which the signals are applied, biasing means connected to the diodes, and an output connected to the diodes and to the biasing means for providing the signal corresponding to the least positive signal.

5. An intermediate amplitude signal selector of the kind described in claim 2 in which the most positive signal selecting means includes a plurality of diodes to which the signals from the least positive signal selecting means are applied, and an output connected to the diodes and to the biasing means for passing the most positive signal.

6. An intermediate signal selector of the king described in claim 1 in which each selective gating circuit has means for selecting the signal corresponding to the signal of the group having the most positive amplitude, and the gating network has means for selecting the least positive signal and provides a signal corresponding to the $r^{th}$ signal.

7. An intermediate amplitude signal selector of the kind described in claim 6 in which the number $N$ of most positive signal selecting means corresponds to the number $m$ of applied signals and to the $r^{th}$ ranking signal to be selected in accordance with the expression $N=(m!/(m-r+1)!(r-1)!)$ and the number of inputs to each most positive signal selecting means equals $(m-r+1)$.

8. An intermediate amplitude signal selector of the king described in claim 6 in which each most positive signal selecting means includes a plurality of diodes to which the signals are applied, biasing means connected to the diodes, and an output connected to the diodes and to the biasing means for providing the signal corresponding to the most positive signal.

9. An intermediate amplitude signal selector of the king described in claim 6 in which the least positive signal selecting means includes a plurality of diodes to which the signals from the most positive selecting means are applied, and an output connected to the diodes and to biasing means for passing the least positive signal.

* * * * *